United States Patent
Iizuka et al.

(10) Patent No.: US 6,427,551 B2
(45) Date of Patent: Aug. 6, 2002

(54) TRANSMISSION FOR VEHICLE

(75) Inventors: Kouichi Iizuka; Kenichi Oshima, both of Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 2 days.

(21) Appl. No.: 09/769,491

(22) Filed: Jan. 26, 2001

(30) Foreign Application Priority Data

Feb. 16, 2000 (JP) ........................................ 2000-038622

(51) Int. Cl.$^7$ ................................................ F16H 3/08
(52) U.S. Cl. ........................... 74/359; 74/333; 74/730.1
(58) Field of Search ........................ 74/359, 331, 333, 74/730.1, 335, 665 R, 392, 393

(56) References Cited

U.S. PATENT DOCUMENTS

| | | | |
|---|---|---|---|
| 4,635,495 A | 1/1987 | White | 74/364 |
| 5,281,190 A | 1/1994 | Koivunen | 475/116 |
| 5,301,564 A | 4/1994 | Muller et al. | 74/333 |
| 5,347,879 A | 9/1994 | Ordo | 74/331 |
| 5,471,892 A | 12/1995 | Sherman | 74/325 |
| 5,588,327 A | 12/1996 | Downs et al. | 74/335 |
| 5,711,409 A | 1/1998 | Murata | 192/87.11 |
| 5,720,203 A | 2/1998 | Honda et al. | 74/325 |
| 6,334,367 B1 | 1/2001 | Hatakeyama et al. | 74/331 |
| 6,186,029 B1 | 2/2001 | McQuinn | 74/718 |

FOREIGN PATENT DOCUMENTS

| | | |
|---|---|---|
| JP | 60-135336 | 7/1985 |
| JP | 6-221347 | 8/1994 |
| JP | 8-4788 | 1/1996 |
| JP | 9-42387 | 2/1997 |

*Primary Examiner*—Charles A. Marmor
*Assistant Examiner*—Tisha D. Lewis
(74) *Attorney, Agent, or Firm*—Foley & Lardner

(57) ABSTRACT

A transmission for a vehicle has a pair of input shafts and an output shaft parallel to the input shafts. A plurality of drive gears is installed on the input shafts, and a plurality of driven gears are installed on the output shaft and meshed with the drive gears, respectively. Gear selecting mechanisms is provided respectively on the shifting input shafts to select one of the drive gears. A power transmitting mechanism is installed to the input and output shafts to transmit power from one of the input shafts to the other input shaft. First and second clutches are installed to the input shafts, respectively to fix the drive gears on the input shafts by the engagement thereof. An idler gear driven by the power transmitting mechanism is installed to the output shaft. A third clutch installed to the output shaft as to be capable of fixedly connecting the output shaft and the idler gear.

11 Claims, 5 Drawing Sheets

TRANSMISSION FOR VEHICLE

BACKGROUND OF THE INVENTION

The present invention relates to an automatic transmission for a vehicle, and more particularly to a transmission which employs a clutch structure containing a power transmission clutch.

This kind of transmissions is arranged to automatically execute clutching operation and shifting operation, which are similar to those executed by a manual transmission, and ensures a high efficiency in power transmission. That is, this kind of the transmissions improves a motive performance and a fuel consumption of a vehicle. Japanese Patent Provisional Publications Nos. H8(1996)-4788, S60(1985)-135336, H6(1994)-221347 and H9(1997)-42387 disclose this kind of transmissions.

For example, Japanese Patent Provisional Publication H8-4788 discloses a transmission in which an outer drive shaft is concentrically disposed around an inner drive shaft and drive gears for respective transmission ratios are disposed around the concentric shafts in series.

However, such a conventional transmission increases its longitudinal dimension according to the increase of the number of transmission ratios. Therefore, if the conventional transmission is adapted to a vehicle equipped with an engine laterally disposed in an engine compartment, the kind of the transmission functions to decrease a longitudinal dimension of a passenger compartment and a space for foots of front seat passengers.

In order to solve the above problems, inventors of the present invention have invented a new type of a transmission in Japanese Patent Application Serial No. H11-280367 which has not been commonly disclosed.

FIG. 4 shows this transmission which comprises a pair of drive shafts 200 and 202 arranged in parallel and a driven shaft 204 in parallel with the drive shafts 200 and 202. Rotational force of an engine is transmitted to the drive shafts 200 and 202 through clutches 206 and 208, respectively. Drive gears 210, 212, 214, 216 and 218 for first to fifth speeds are alternately installed on the drive shafts 200 and 202. Driven gears 220, 222, 224, 225 and 228 corresponding to the drive gears 210, 212, 214, 216 and 218 are fixedly installed on the driven shaft 204. Gear selecting mechanisms for selecting one of the drive gears are installed to the drive shafts 200 and 202, respectively. Thus arranged transmission solves the problems raised in the above-mentioned convention transmission of Japanese Patent Provisional Publication No. H8-4788.

SUMMARY OF THE INVENTION

However, this proposed transmission is further required to improve smoothness in shifting operation, more specifically in shifting operations between second and fourth speeds and between third and fifth speeds.

It is therefore an object of the present invention to provide an improved transmission which is capable of suppressing the size of the transmission even if the number of shift positions is increased and which is capable of executing a preferred one-step jump shifting without generating shocks or delay of shifting operation.

A transmission according to the present invention is for a vehicle and comprises a first drive shaft, a first shifting shaft coaxially arranged with the first drive shaft, a first clutch disposed between the first drive shaft and the first shifting shaft. The first clutch is capable of fixedly connecting the first drive shaft and the first shifting shaft. A second drive shaft is disposed in parallel with the first drive shaft. A second shifting shaft is coaxially arranged with the second shifting shaft. A second clutch is disposed between the second drive shaft and the second shifting shaft and is capable of fixedly connecting the second drive shaft and the second shifting shaft. A power transmitting mechanism transmits rotational power from the first drive shaft to the second drive shaft. A plurality of drive gears are disposed on the first and second shifting shafts. An output shaft is arranged parallel with the first and second drive shafts. A plurality of driven gears are fixed to the output shaft and are meshed with the drive gears, respectively. A shifting drive gear is fixed to the first drive shaft. A shifting driven gear is disposed on the output shaft and is meshed with the shifting drive gear. A third clutch is capable of fixedly connecting the shifting driven gear with the output shaft.

DETAILED DESCRIPTION OF THE INVENTION

Figure 1:
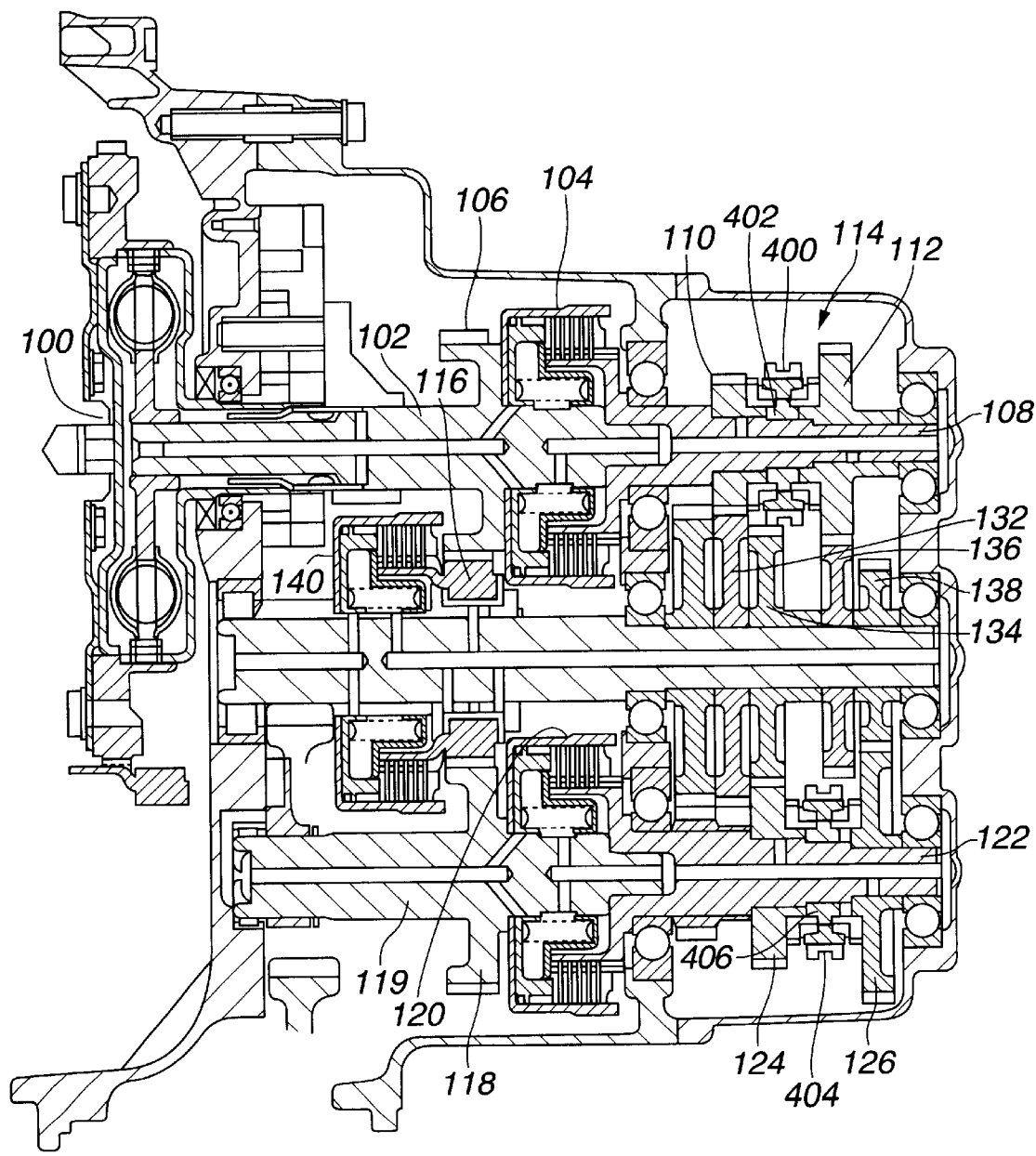
FIG. 1 is a cross sectional view showing an inner structure of a transmission according to an embodiment of the present invention.
Figure 2:
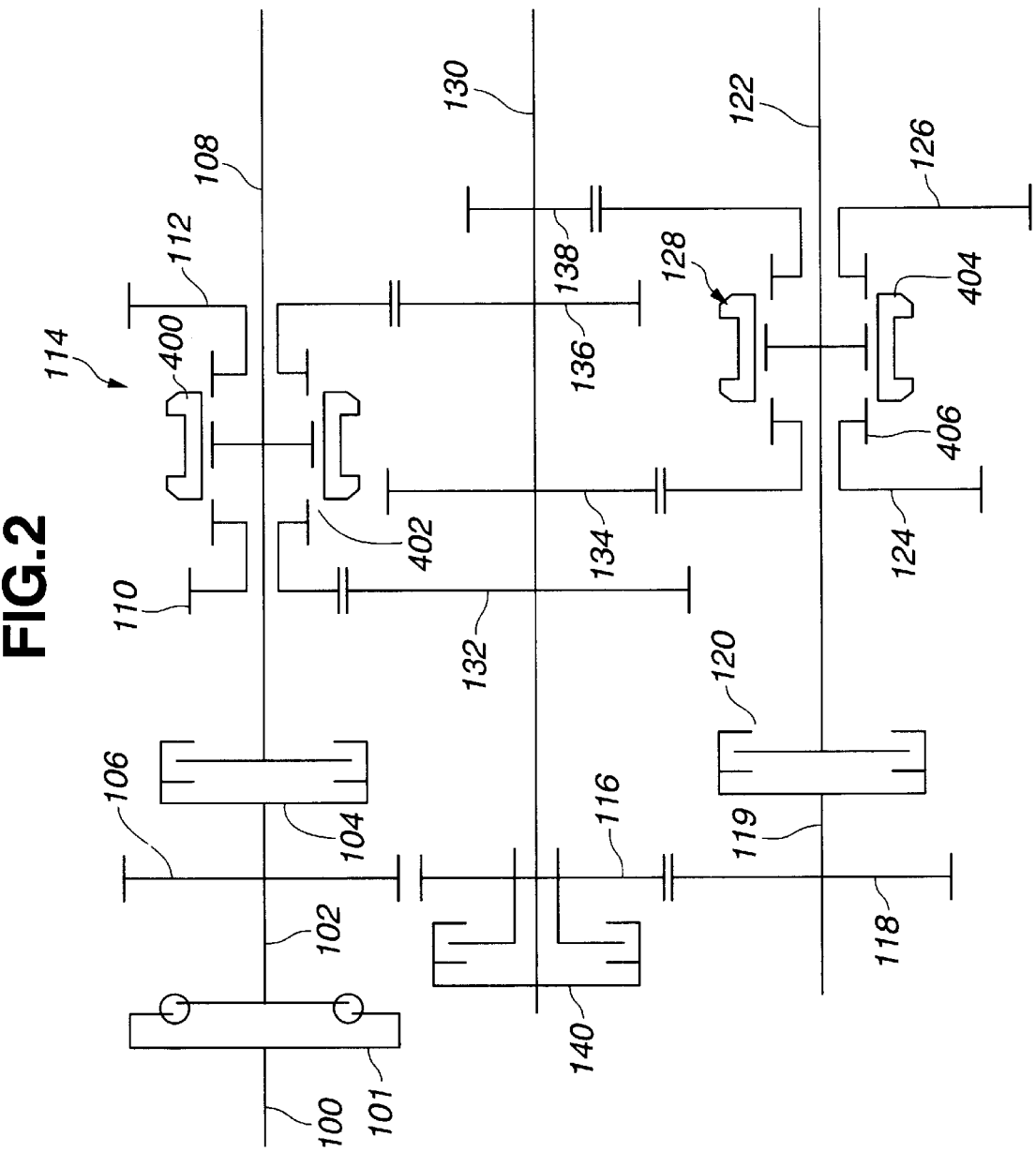
FIG. 2 is a skeleton view showing a schematic structure of the transmission of FIG. 1.
Figure 3:
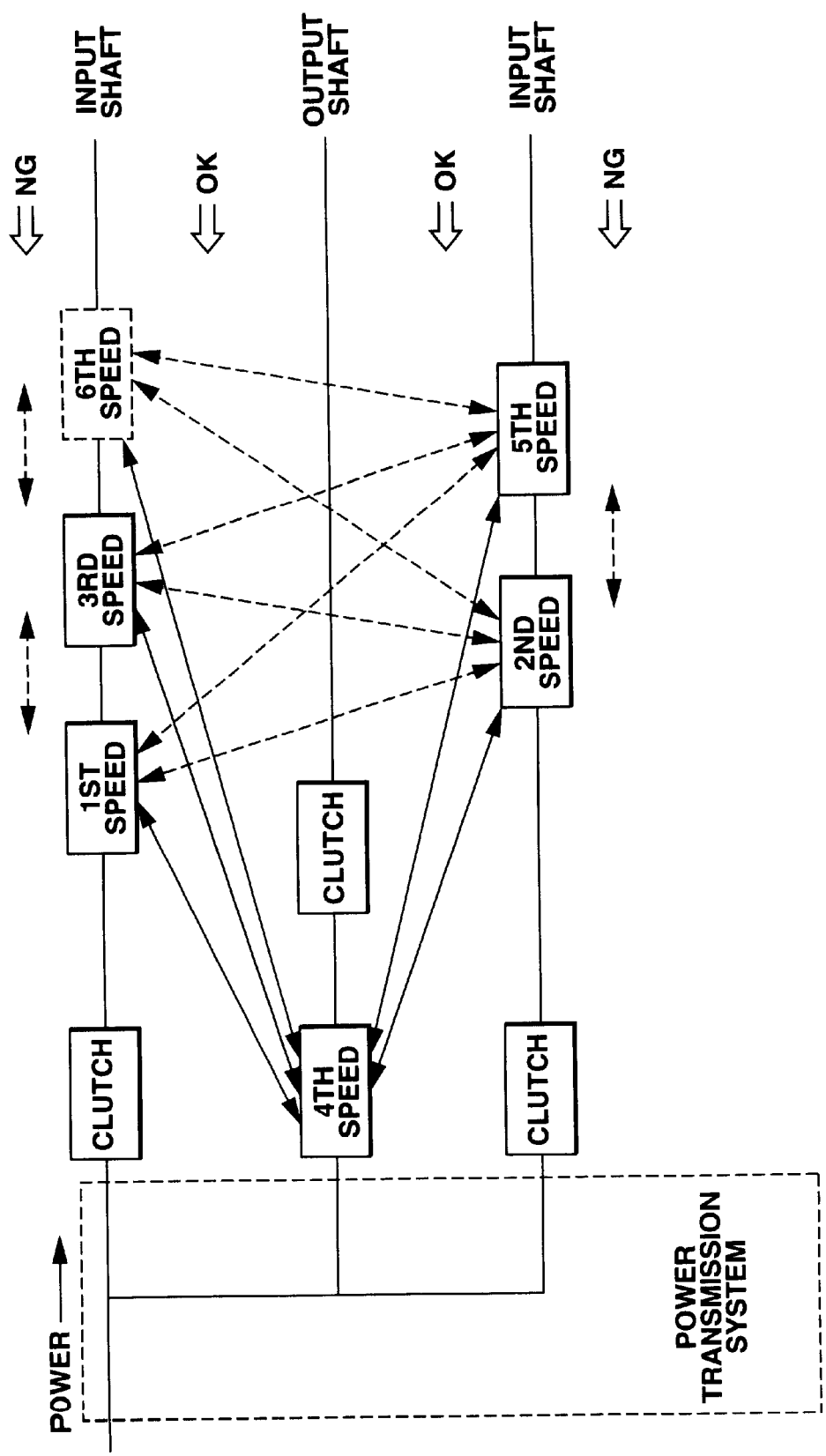
FIG. 3 is a block diagram for explaining shifting operations of the transmission of FIG. 1.
Figure 4:
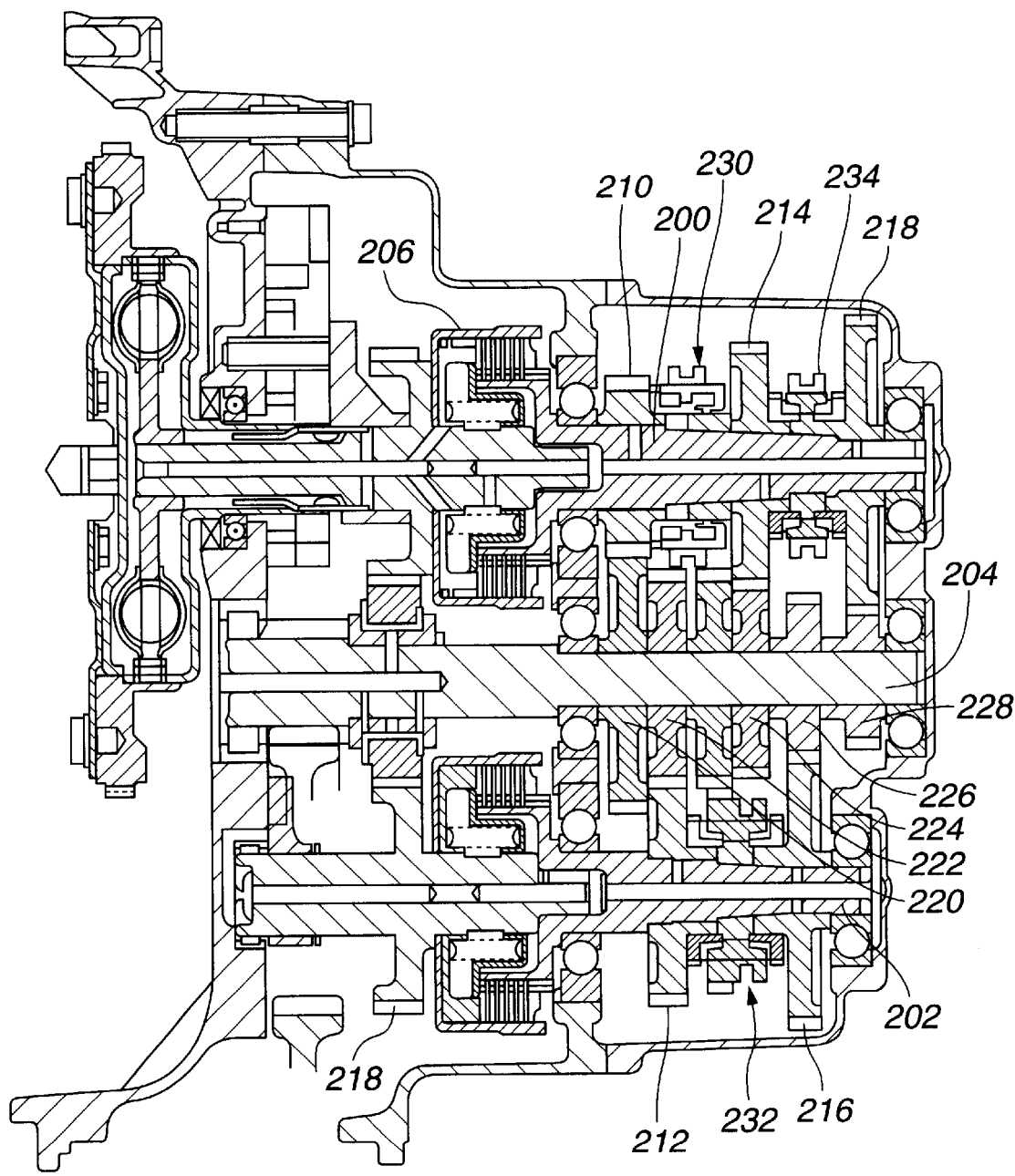
FIG. 4 is a schematic view showing a construction of a referenced transmission.
Figure 5:
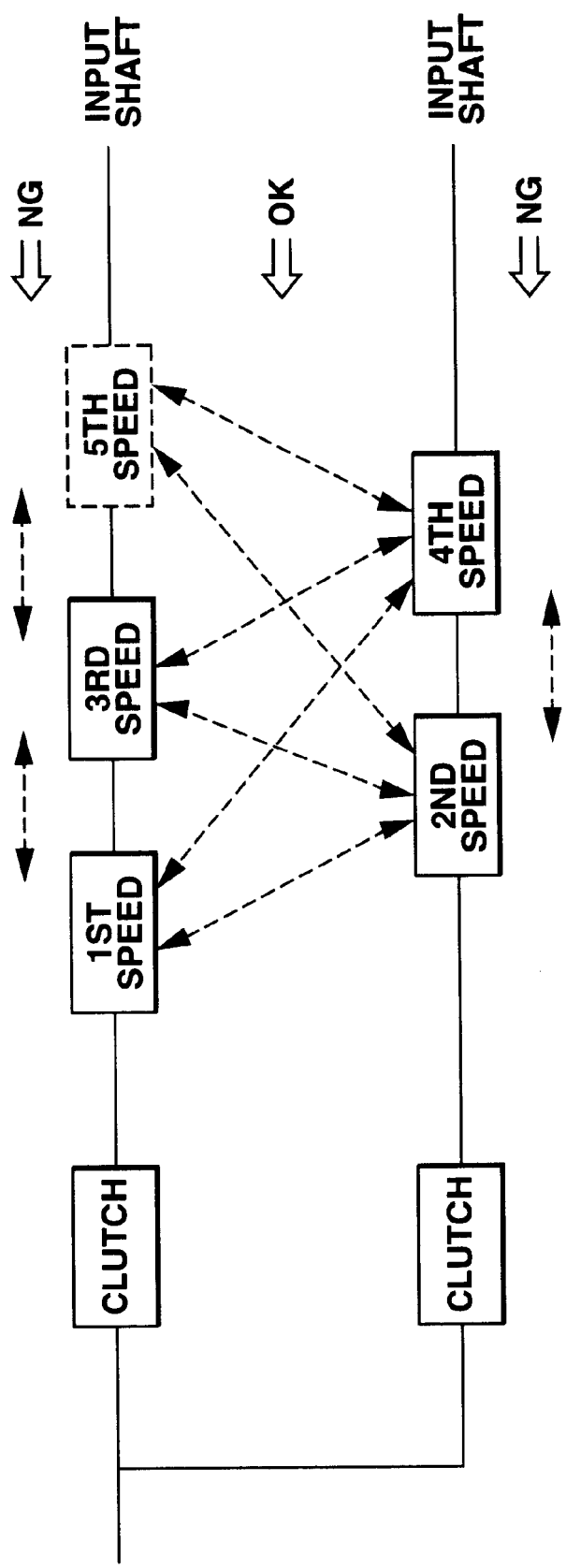
FIG. 5 is a block diagram for explaining shifting operations of the transmission of FIG. 4.

Referring to FIGS. 1 to 3, there is shown an embodiment of a transmission according to the present invention.

FIG. 1 shows an inner structure of the transmission according to the embodiment of the present invention. FIG. 2 shows a schematic structure of the transmission according to the present invention. The transmission is for a vehicle and comprises a first drive shaft 102 connected to an engine output shaft 100 of the engine through a damper coupling 101. The first drive shaft 102 is integral with a first input drive gear 106 and is connected to a first clutch 104. An output portion of the first clutch 104 is connected to a first shifting input shaft 108 to transmit the power of the engine. The first clutch 104 is arranged to connect and release the first drive shaft 102 with and from the first shifting input shaft 108 according to a control signal from a control unit (not shown). A first-speed drive gear 110 and a third-speed drive gear 112 are arranged on the first shifting input shaft 108 in tandem. The first-speed drive gear 110 and the third-speed drive gear 112 are rotatable on the first shifting input shaft 108, and a first selecting mechanism 114 is provided therebetween. The first selecting mechanism 114 is of a synchromesh type and has a sleeve 400 and a hub 402. The first selecting mechanism 114 is capable of selecting one of the first-speed drive gear 110 and the third-speed drive gear 112 and fixedly connects the selected gear 110 or 112 to the first shifting input shaft 108.

The first input drive gear 106 is meshed with an idler gear 116 of a fourth-speed gear, and the idler gear 116 is meshed with a second input drive gear 118, in the power transmitting mechanism. The second input drive gear 118 is integrally connected to a second drive shaft 119 fixed to an input portion of the second clutch 120, and the output of the second clutch 120 is transmitted to a second shifting input shaft 122. The second clutch 120 is arranged to connect and release the second drive shaft 119 with and from the second shifting input shaft 122 according to a control signal from the control unit. The second clutch 120 is located in parallel to the first clutch 104 in a separated state, and the second shifting input shaft 122 is supported to a housing of the transmission to be in parallel to the first shifting input shaft 108.

A second-speed drive gear 124 and a fifth-speed drive gear 126 are installed on the second shifting input shaft 122 in tandem. The second-speed drive gear 124 and the fifth-speed drive gear 126 are rotatable on the second shifting input shaft 122, and a second selecting mechanism 128 is located therebetween. The second selecting mechanism 128 is of a synchromesh type and has a sleeve 404 and a hub 406. The second selecting mechanism 128 is capable of selecting one of the second-speed drive gear 124 and the fifth-speed drive gear 126 and fixedly connects the selected gear 124 or 126 to the second shifting input shaft 122.

A shifting output shaft 130 is supported to the housing of the transmission so as to be parallel with the first shifting input shaft 108 and the second shifting input shaft 122. First-speed, second-speed, third-speed, and fifth-speed driven gears 132, 134, 136 and 138 are fixedly installed on the shifting output shaft 130 in the direction toward the right hand side in FIG. 1. The driven gears 132, 134, 136 and 138 are always meshed with the drive gears 110, 112, 124 and 126, respectively.

A third clutch 140 is disposed at a left hand side relative to the idler gear 116 in FIG. 1. That is, the third clutch 140 is offset relative to the first clutch 104 and the second clutch 120 in the axial direction toward the engine output shaft 100. The third clutch 140 is disposed coaxially with the idler gear 116 and the shifting output shaft 130, and is driven by the idler gear 116 to drive the shifting output shaft 130. More specifically, the third clutch 140 is arranged to connect and release the idler gear 116 with and from the shifting output shaft 130 according to a control signal from the control unit. Each of the third clutch 140, the first clutch 104 and the second clutch 120 employs a multi-plate type clutch which performs high control responsibility, as shown in FIG. 1. It will be understood that instead of the multi-plate type clutch, a mono-plate type clutch may be employed. Further, the shifting output shaft 130 is offset relative to an imaginary plan including the first shifting input shaft 108 and the second shifting input shaft 122.

As mentioned above, the transmission comprises the two input shafts 108 and 122 and the one output shaft 130 each of which comprises a clutch 104, 118, 140. That is, the transmission according to the present invention is formed into a structure having three shafts and three clutches. The drive gears 110, 124, 112 and 126 and the driven gears 132, 134, 136 and 138 are arranged on the first and second shifting input shafts 108 and 122 and the output shaft 130, respectively, in the axial direction in the order of transmission ratio. More specifically, the drive gears 110 and 112 are arranged on the first shifting input shaft 108 in size order. Similarly, the drive gears 124 and 126 are arranged on the second shifting input shaft 122 in size order. Further, the driven gears 132, 134, 136 and 138 are arranged on the shifting output shaft 130 in size order so as to gradually decrease the size toward the right hand side in FIG. 1.

When the first clutch 104 is put in an engaged state, the driving force of the engine is transmitted to the first input shaft 108 through the first drive gear 106 and the first clutch 104. When the second clutch 120 is put in an engaged state, the driving force of the engine is transmitted to the second input shaft 122 through the idler gear 116, the second drive gear 118 and the second clutch 120. Further, when the third clutch 140 is put in an engaged state, the driving force of the engine is transmitted to the shifting output shaft 130 through the first input drive gear 106, the idler gear 116 and the third clutch 140.

The transmission ratio of the transmission is determined by controlling the first, second and third clutches 104, 120 and 140 and the first and second selecting mechanisms 114 and 128. When the first clutch 104 is put in the engaged state, the first speed or third speed is selected by the first selecting mechanism 114. When the second clutch 120 is put in the engaged state, the second speed or fifth speed is selected by the second selecting mechanism 128. When the third clutch 140 is put in the engaged state, the fourth speed is selected through the idler gear 116.

With the thus arranged embodiment, the drive gears 110, 112, 124 and 126 and the first and second selecting mechanisms 114 and 128 are installed to the first and second shifting input shafts 108 and 122, and the driven gears 132, 134, 136 and 138 are installed to the output shaft 130. The installed elements (drive gears and driven gears) are arranged in the axial direction in the order of the transmission ratio and dispersedly installed to the three shafts 108, 122 and 130, as shown in FIGS. 1 and 2. Therefore, this arrangement according to the present invention decreases the longitudinal dimension of the transmission. Accordingly, even if the number of the selectable transmission ratios is increased, the increase of the longitudinal dimension of the transmission is suppressed. That is, this arrangement according to the present invention ensures a sufficient space in the lateral direction of the vehicle in an engine compartment and ensures a longitudinal directional space in a passenger compartment and a space for foots of passengers seated on a front seat.

As shown in FIG. 3, the transmission according to the present invention is capable of smoothly and quickly executing a shifting operation between the first speed and the second speed ($1^{st} \Leftrightarrow 2^{nd}$), a shifting operation between the first speed and the fifth speed ($1^{st} \Leftrightarrow 5^{th}$), a shifting operation between the third speed and the second speed ($3^{rd} \Leftrightarrow 2^{nd}$), and a shifting operation between the third speed and the fifth speed ($3^{rd} \Leftrightarrow 5^{th}$), since these shifting operations are executed by changing the input shaft 104, 122. Similarly, the transmission is capable of smoothly and quickly executing shifting operations of the fourth speed of the output shaft 130 from and to the first speed and the third speed of the first input shaft 108, from and to the second speed and the fifth speed ($4^{th} \Leftrightarrow 1^{st}$, $4^{th} \Leftrightarrow 3^{rd}$, $4^{th} \Leftrightarrow 2^{nd}$, $4^{th} \Leftrightarrow 5^{th}$). Further, since the first and second clutches 104 and 120 are arranged side by side in the same direction as shown in FIG. 1, an axial dimension necessary for the clutches 104 and 120 is decreased. Therefore, it becomes possible to decrease the axial dimension of the transmission.

Furthermore, the third clutch 140 is arranged at a position different from those of the first and second clutches 104 and 120 in the axial direction, and the output shaft 130 is offset from an imaginary plane including the first and second input shafts 108 and 120. Therefore, it becomes possible to decrease the size of the transmission. Additionally, an envelope shape of the drive gears 110, 112 on the first input shaft 108 and an envelope shape of the drive gears 124 and 126 on the second input shaft 122 are shaped into a truncated cone, and an envelope shape of the driven gears 132, 134, 136, 138 on the output shaft 130 is shaped into a truncated cone directing in the inverse direction of the truncated cones of the drive gears 110, 112, 124, 126 on the first and second input shafts 108 and 122.

Therefore, the gears 110, 112, 124, 126, 132, 134, 136, and 138 are correctly assembled in order without any intention of operators. Further, by assembling the gears by each shaft, the accuracy and assembling efficiency are further improved.

Furthermore, since the transmission according to the present invention employs a compact gear, which performs high-durability and high-reliability, for the power transmitting mechanism, and is arranged to install the shift gears in the power transmission passage, it becomes possible to decrease the number of parts of the transmission according to the present invention. Furthermore, by integrally providing the damper 101 in the transmission as a shock absorbing means, the assembling easiness of the transmission is further improved.

With the thus discussed arrangement according to the present invention, it becomes possible to suppress the size of the transmission even if the number of shift positions is increased, and to execute a preferred one-step jump shifting without generating shocks or delay of shifting operation.

More specifically, the transmission according to the present invention is arranged to comprise two parallel input shafts and an output shaft each of which has a clutch. Accordingly, the engine output is transmitted from one input shaft to the other input shaft through the power transmitting mechanism and clutches and is further transmitted from the power transmitting mechanism through the shift gear and the clutch to the output shaft.

The plurality of drive gears 110, 112, 124, 126 and the drive gear selecting mechanisms 114 and 128 are installed to both input shafts 108 and 122, and only the driven gears 132, 134, 136, 138 are installed on the output shaft 130. Further, the members such as the drive gears, the drive gear selecting mechanisms and the driven gears are installed to the three shafts, respectively. This arrangement enables the longitudinal dimension (axial dimension) of the transmission to be shortened. Accordingly, the degree of the increase of the longitudinal dimension of the transmission is suppressed although the number of the shift positions. Consequently, this arrangement enables ensuring the space in the engine room in the lateral direction and ensuring the space of the longitudinal dimension of the vehicle compartment and the space for the foots of vehicle occupants.

Since the power of the engine is transmitted to the output shaft of the transmission through the power transmitting mechanism, the shift gear and the clutch, the shifting operation is directly and smoothly executed from the input shaft to the output shaft.

As shown in FIG. 3, the fourth speed gear is installed on the output shaft, and therefore the power of the engine is transmitted from the power transmitting mechanism to the output shaft through the fourth speed gear and the clutch. Further, since the first, third and sixth speed gears are installed on the first input shaft and since the second and fourth speed gears are installed on the second input shaft, it becomes possible to smoothly and quickly execute shifting between the first speed and the second speed ($1^{st} \Leftrightarrow 2^{nd}$), shifting between the first speed and the fifth speed ($1^{st} \Leftrightarrow 5^{th}$), shifting between the third speed and the second speed ($3^{rd} \Leftrightarrow 2^{nd}$), and shifting between the third speed and the fifth speed ($3^{rd} \Leftrightarrow 5^{th}$). Further, since the shaft having a gear under the engaged state is different from the shaft having a gear next engaged, the transmission according to the present invention is capable of smoothly and quickly executing shifting of the fourth speed of the output shaft 130 from and to the first speed and the third speed of the first input shaft 108, from and to the second speed and the fifth speed ($4^{th} \Leftrightarrow 1^{st}$, $4^{th} \Leftrightarrow 3^{rd}$, $4^{th} \Leftrightarrow 2^{nd}$, $4^{th} \Leftrightarrow 5^{th}$).

The entire contents of Japanese Patent Application No. 2000-38622 filed on Feb. 16, 2000 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A transmission comprising:
a pair of power input shafts arranged in parallel;
a power transmitting mechanism transmitting power inputted to one of said power input shafts to the other of said power input shafts, said power transmitting mechanism including a power transmitting input gear fixed on one of said power input shafts, a power transmitting outputting gear fixed on the other of said power input shafts, and an idler gear;
a pair of shifting input shafts extending from said power input shafts, respectively;
a pair of input clutches capable of fixedly connecting said power input shafts with said shifting input shafts, respectively, said input clutches being aligned on a line perpendicular to an axial direction of said power input shaft;
a plurality of shifting drive gears installed on said shifting input shafts;
an output shaft arranged in parallel with said power input shafts, the idler gear of said power transmitting mechanism being disposed on said output shaft;
a plurality of shifting driven gears fixed on said output shaft, said shifting driven gears being meshed with said shifting drive gears, respectively; and
a shifting clutch capable of fixedly connecting the idler gear with said output shaft.

2. A transmission comprising:
a first drive shaft;
a first shifting shaft coaxially arranged with said first drive shaft;
a first clutch disposed between said first drive shaft and said first shifting shaft, said first clutch being capable of fixedly connecting said first drive shaft and said first shifting shaft;
a second drive shaft disposed in parallel with said first drive shaft;
a second shifting shaft coaxially arranged with said second drive shaft;
a second clutch disposed between said second drive shaft and said second shifting shaft, said second clutch being capable of fixedly connecting said second drive shaft and said second shifting shaft;
a power transmitting mechanism transmitting rotational power from said first drive shaft to said second drive shaft;
a plurality of drive gears disposed on said first and second shifting shafts;

an output shaft arranged parallel with said first and second drive shafts;

a plurality of driven gears fixed to said output shaft, said driven gears being meshed with said drive gears, respectively;

a shifting drive gear fixed to said first drive shaft;

a shifting driven gear disposed on said output shaft, said shift driven gears being meshed with said shifting drive gear; and a third clutch capable of fixedly connecting said shifting driven gear with said output shaft.

3. The transmission as claimed in claim 2, wherein several of said drive gears are installed on said first shifting shaft so that transmission ratios of the several of the drive gears gradually varied from an end connected to said first drive shaft to the other end, and the other of said drive gears are arranged on said second shifting shaft so that transmission ratios of the other of drive gears gradually varied from an end connected to said second drive shaft toward the other end.

4. The transmission as claimed in claim 2, wherein transmission ratios of adjacent drive gears on said first shifting shaft are apart with each other by at least one shift step, and transmission ratios of adjacent drive gears on said second shifting shaft are apart with each other by at least one shift step.

5. The transmission as claimed in claim 2, wherein said power transmitting mechanism comprises a first input drive gear installed on said first shifting shaft, a second input drive gear installed on said second shifting shaft, and an idler gear rotatably supported to said output shaft, the idler gear being disposed on said output shaft and transmitting the power of the engine from the input drive gear to the input driven gear.

6. The transmission as claimed in claim 5, wherein said shifting drive gear acts as the first input drive gear of said power transmitting mechanism, and said shifting driven gear acts as the idler gear of the power transmitting mechanism.

7. The transmission as claimed in claim 2, wherein each of said first, second and third clutches is a multi-plate type clutch.

8. The transmission as claimed in claim 2, further comprising damper coupling means for absorbing shock load between the engine and the transmission.

9. An transmission connected to an output shaft of an engine, comprising:

a first clutch having an input portion and an output portion which are capable of being fixedly connected;

a first drive shaft fixed to the input portion of said first clutch and to the output shaft of the engine;

an input drive gear installed on said first drive shaft a first shifting input shaft fixed to the output portion of said first clutch;

a plurality of drive gears installed on said first shifting input shaft;

a first gear-selecting mechanism selectively fixing one of the drive gears to the first shifting input shaft;

an idler gear meshed with said input drive gear;

an input driven gear meshed with said idler gear;

a second clutch having an input portion and an output portion which are capable of being fixedly connected, the input portion of said second clutch being fixed to said input driven gear;

a second shifting input shaft arranged parallel with said first shifting input shaft, said second shifting input shaft being fixed to the output portion of said second clutch;

a plurality of drive gears installed on said second shifting input shaft;

a second gear-selecting mechanism selectively fixing one of the drive gears on said second shifting input shaft to said second shifting input shaft;

an output shaft arranged parallel with said first and second shifting input shafts;

a plurality of driven gears fixed on said output shaft, said driven gears being meshed with the drive gears on said first and second shifting input shafts, respectively, and a third clutch capable of fixedly connecting said output shaft to said idler gear.

10. The transmission as claimed in claim 9, wherein said drive gears on said first shifting input shaft are arranged in order of size, said drive gears on said second shifting input shaft are arranged in order of size, and said driven gears on said output shaft are arranged in order of size.

11. The transmission as claimed in claim 9, wherein each of said first, second and third clutches is a plate type clutch, and said third clutch is arranged to be offset from a plane including said first and second clutches.

* * * * *